July 7, 1970   G. H. RÖHM   3,518,904
LATHE CARRIER CENTER
Filed June 4, 1968

INVENTOR
GUENTER HORST ROEHM

BY Otto John Munz
ATTORNEY

United States Patent Office 3,518,904
Patented July 7, 1970

3,518,904
LATHE CARRIER CENTER
Günter Horst Röhm, Sontheim (Brenz), Germany, assignor to Rohm-Gesellschaft m.b.H., Sontheim (Brenz), Germany
Filed June 4, 1968, Ser. No. 734,326
Claims priority, application Germany, Mar. 6, 1968, R 37,082
Int. Cl. B23b 23/02
U.S. Cl. 82—33       2 Claims

ABSTRACT OF THE DISCLOSURE

A lathe carrier center with an exchangeable work-carrier head, wherein the shank of the lathe center has a radial flange intermediate its ends and the carrier head which has an axial bore is slipped over the front part of the shank and is held in connection with the flange by at least one permanent magnet which is mounted in a bore in the flange.

---

Figure 1:
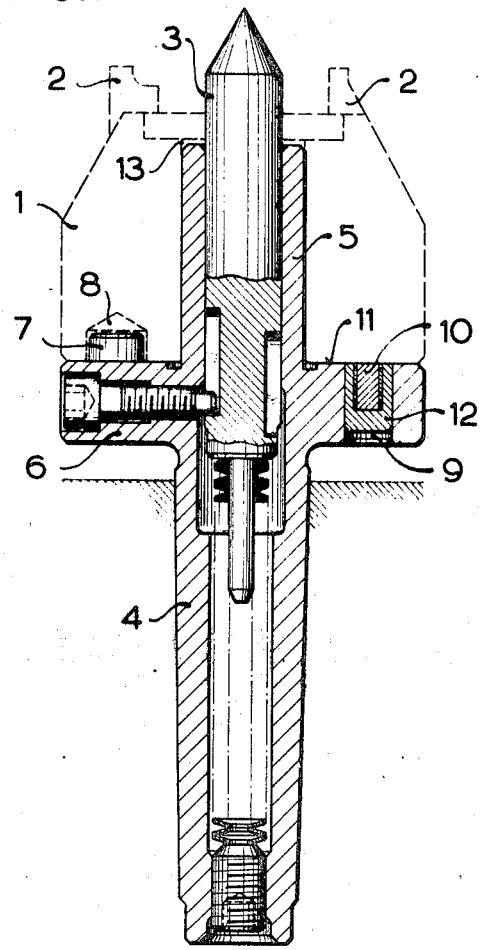

The present invention relates to a lathe carrier center with an exchangeable work-carrier head, wherein the shank of the tool which carries the actual center is provided with a radial flange intermediate its ends, and the carrier head which is provided with an axial bore is slipped over the front part of the shank so that the rear end wall of the head rests against the flange, while the rotation of the shank and center is transmitted to the carrier head by one or more studs projecting axially from the flange and engaging into corresponding socket bores in the rear end wall of the head.

Lathe carrier centers of the above-mentioned type have been very successful in actual practice. The carrier head of such a lathe center which is provided with carrier pins projecting from its front end may be easily applied upon a workpiece which is mounted between two centers and is to be machined along its entire length. Since this carrier head is easily removable from the lathe center, it may be quickly exchanged for another which is provided with carrier pins for taking along a workpiece of a different diameter.

Although when such a carrier head is mounted in the proper position on the lathe center and applied with pressure against a workpiece, its connection to the center by the engagement of the driving studs on the radial flange of the center into the socket bores of the carrier head is sufficiently secure, there are no means for maintaining this connection when this pressure is removed and the carrier head may then be accidentally withdrawn from the driving studs. The carrier head may also be accidentally withdrawn from the driving studs or even entirely from the lathe center as long as the latter is not in use and the carrier head is not pressed in the axial direction against a workpiece.

It is therefore an object of the present invention to provide a lathe carrier center of the type as described above which, while permitting the carrier head to be easily removed from the lathe center and to be exchanged for another, is provided with very simple means for connecting the carrier head so securely to the flange on the lathe center that it cannot fall off or be accidentally withdrawn from the center or the flange thereon, but will require a certain force to separate it from the flange.

According to the present invention, this object is attained by the provision of suitable magnetic means for connecting the carrier head to the flange on the lathe center. According to one preferred embodiment of the invention, the radial flange on the lathe center is provided with at least one axially extending bore into which a permanent magnet is inserted so that one end surface of the magnet is flush with the front surface of the flange against which the rear end surface of the carrier head may be applied. Therefore, when the carrier head is fitted over the lathe center and applied in the proper position against the flange so that the driving studs on the flange engage into the corresponding bores in the carrier head, there will be no air gap between the permanent magnet or magnets and the rear surface of the carrier head. The permanent magnet is preferably inserted into a bushing which, in turn, is pressed tightly into the axial bore in the radial flange.

Instead of mounting the permanent magnet or magnets in the flange of the lathe center, it is, of course, also possible to mount them in the carrier head. This may be advisable if the driving studs are provided on the carrier head rather than on the flange and are adapted to engage into corresponding bores in the flange.

The advantages which are attained by the present invention consist primarily in the fact that by the provision of single means which may be manufactured very easily and at a low expense, namely, the permanent magnet, the carrier head will be prevented from being accidentally withdrawn from the lathe center and will also be held in close connection with the radial flange of the lathe center even though no pressure is exerted by a workpiece in the axial direction upon the carrier head, and that these means will also not impair the easy exchangeability of the carrier head.

Figure 2:
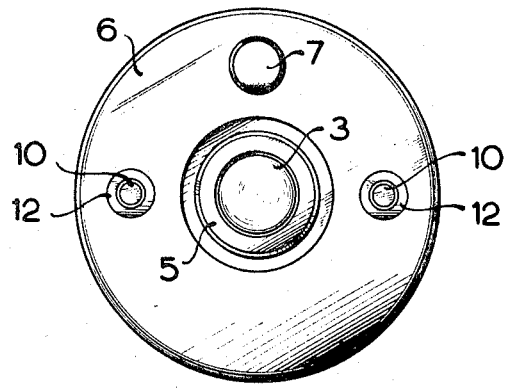

The features and advantages of the present invention will become further apparent from the following detailed description thereof which is to be read with reference to the accompanying drawings, in which:

FIG. 1 shows an axial section of a lathe carrier according to the invention, in which the carrier head is merely indicated in dotted lines; while FIG. 2 shows a top view of the carrier center according to FIG. 1, from which the carrier head has been removed.

As illustrated in the drawings, the lathe carrier center according to the invention comprises a work-carrier head 1, as indicated in FIG. 1 in dotted lines, which is provided with carrier projections 2 which may be either rigid with the carrier head 1 or resiliently mounted thereon. In order to permit the carrier head 1 to be easily exchanged, it is removably mounted on a shank 4 into which the center 3 is inserted which may be either rigidly connected to the shank 4 or be slidable therein in its axial direction against the action of a spring, for example, in the manner as illustrated in FIG. 1. For mounting the carrier head 1 on the shank 4, the carrier head is provided with a central bore 13 and slipped over a tubular extension 5 of the shank 4 until its rear end wall 11 engages upon a radial flange 6 on the shank 4. For transmitting the rotary movement of shank 4 and center 3 to the carrier head 1, flange 6 is provided with at least one stud 7 which projects therefrom in the axial direction and is adapted to engage into a corresponding socket bore 8 in the rear end wall 11 of the carrier head 1.

For normally maintaining the end wall 11 of the carrier head 1 in firm connection with the flange 6 when the lathe carrier center is not in operation and no axial pressure is exerted by a workpiece upon the carrier projections 2, the present invention provides suitable magnetic connecting means. In the particular embodiment of the lathe carrier head as illustrated in the drawings, these magnetic connecting means are of a very simple and inexpensive nature and consist of at least one permanent magnet 10 which is tightly fitted into a corresponding axial bore 9 in the flange 6 so that the front surface of this magnet 10 is flush with the front surface of the flange 6 upon which the rear end wall 11 of the carrier head 1 is applied. Thus, no air space remains between the magnet 10 and the carrier head 1 when the latter engages upon the flange 6. As illustrated in the drawings, it is advisable for reasons of manufacture not to mount the permanent magnet directly in the flange 6 but to insert it into a bushing 12 which, in turn, is pressed tightly into the bore 9.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a lathe carrier center having a shank carrying a lathe center and a radial flange member on said shank intermediate its ends, and a removable carrier head member having a central bore slidable over the front end of said shank and into engagement with said flange member and adapted to be easily exchanged for another carrier head member of a similar kind, one of said members having at least one aperture in the surface facing the other member, and at least one driving stud on said other member adapted to engage into said recess when said head member is moved into engagement with said flange member, the improvement consisting of magnetic means for holding said head member in engagement with said flange member, in which a first of said members has at least one bore parallel to the axis of said shank, said magnetic means comprising a permanent magnet inserted into said bore and having an end surface flush with the surface of said first member facing the second member so that, when said two members are applied against each other, no air gap remains between said magnet and said second member.

2. A lathe carrier center as defined in claim 1, further comprising a bushing pressed tightly into said bore, and said permanent magnet being fitted into said bushing.

References Cited

UNITED STATES PATENTS 2,971,413    2/1961    Rohm _____ 82—33

FOREIGN PATENTS 491,920    2/1930    Germany.

LEONIDAS VLACHOS, Primary Examiner

U.S. Cl. X.R.

82—40